United States Patent [19]

Miyao et al.

[11] Patent Number: 4,774,666

[45] Date of Patent: Sep. 27, 1988

[54] TRANSLATING APPARATUS

[75] Inventors: Kouji Miyao, Kashihara; Hitoshi Suzuki, Nara; Hazime Asano, Nara; Shinji Tokunaga, Nara; Yasuhiro Takiguchi, Nara; Shuzo Kugimiya, Yamatokoriyama, all of Japan

[73] Assignee: Sharp Kabushiki Kaisha, Osaka, Japan

[21] Appl. No.: 863,018

[22] Filed: May 14, 1986

[30] Foreign Application Priority Data

| May 14, 1985 | [JP] | Japan | 60-103367 |
| May 14, 1985 | [JP] | Japan | 60-103368 |
| May 14, 1985 | [JP] | Japan | 60-103369 |
| May 14, 1985 | [JP] | Japan | 60-103370 |

[51] Int. Cl.⁴ .............................................. G06F 9/00
[52] U.S. Cl. ...................................... 364/419; 364/900
[58] Field of Search ... 364/200 MS File, 900 MS File, 364/300, 419; 340/723

[56] References Cited

U.S. PATENT DOCUMENTS

| 4,193,119 | 3/1980 | Arase et al. | 364/900 |
| 4,412,305 | 10/1983 | Yoshida | 364/419 |
| 4,420,816 | 12/1983 | Toshida | 364/900 |
| 4,456,973 | 6/1984 | Carlgren et al. | 364/300 |
| 4,475,171 | 10/1984 | Kawou | 364/900 |
| 4,542,478 | 9/1985 | Hashimoto et al. | 364/900 |
| 4,559,598 | 12/1985 | Goldwasser et al. | 364/419 |
| 4,584,667 | 4/1986 | Hashimoto et al. | 364/900 |
| 4,599,612 | 7/1986 | Kaji et al. | 340/723 |

FOREIGN PATENT DOCUMENTS 0192173  11/1983  Japan .................................. 364/419

*Primary Examiner*—Gareth D. Shaw
*Assistant Examiner*—John G. Mills, III
*Attorney, Agent, or Firm*—Birch, Stewart, Kolasch & Birch

[57] ABSTRACT

A translating apparatus comprising a synonym display device for displaying synonyms related to a certain translated term in a translated sentence, and a replacing arrangement for replacing the certain translated term with an appropriate synonym selected among the synonyms displayed by the display device, whereby a more suitable translated term or terms can be selected through consultation of a dictionary contained in the apparatus.

1 Claim, 13 Drawing Sheets buffer A ---- original sentence

| t | h | i | s |  |  |  |  |
|---|---|---|---|---|---|---|---|
| i | s |  |  |  |  |  |  |
| a |  |  |  |  |  |  |  |
| p | e | n |  |  |  |  |  |
|  |  |  |  |  |  |  |  | buffer B --- part of buffer

| this --- | pronoun | indicating adjective |  |
|---|---|---|---|
| is --- | verb |  |  |
| a --- | article |  |  |
| pen --- | noun |  |  | buffer C --- analyzed buffer buffer D ———changed buffer

```
              sentence
             /        \
        subject      predicate
           |         /      \
      noun phrase  noun phrase  verb
           |            |        |
        pronoun        noun      |
           |            |        |
         this         a pen      is
``` buffer E ———output buffer

| this | is | a | pen |

| word | | figure |
|---|---|---|
| translated term | ⓵ | person |
| | ② | character |
| | ③ | figure painting |
| | ④ | portrait |

| word | | figure |
|---|---|---|
| translated term | ① | person |
| | ⓶ | character |
| | ③ | figure painting |
| | ④ | portrait |

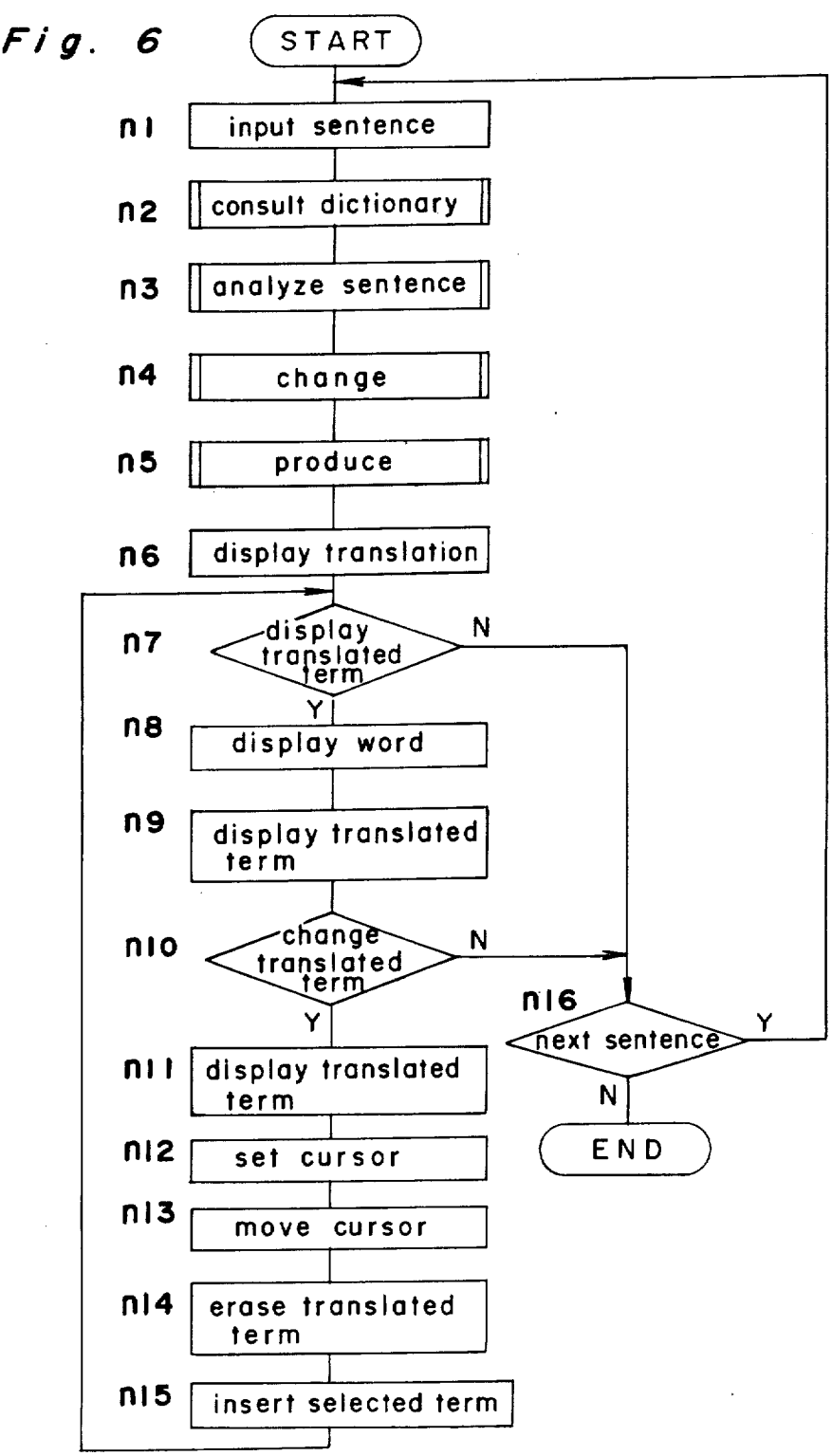

Fig. 11

| original sentence in English | translated sentence in Japanese |
|---|---|

◊ We have duly received your letter and the returned goods.
間違いなく私たちはあなたの手紙と返品を受け取った。
(MACHIGAINAKU WATAKUSHITACHIWA HENPINTO ANATANO TEGAMIO UKETOTTA)

◊ An immediate checkup has revealed that the goods of our shipment were entirely different from your order.
即座の照合によってこれらの我々の船積みの品々があなたのオーダーと全く異なっていたことが明らかになった。
(SOKUZANO SHOGONIYOTTE WAREWARENO FUNAZUMINO SHOHINGA ANATANO ODERTO MATTAKU KOTONATTEITA KOTOGA AKIRAKANI NATTA)

◊ The trouble was caused by the careless handling on the part of our employees.
トラブルはわが社の作業員の側の不注意な取り扱いによって引き起された。
(TORABURUWA WAREWARENO SAGYOINNOGAWANO FUCHUINO TORIATSUKAINIYOTTE HIKIOKOSARETA)

◊ We will make every endeavor to prevent the recurrence of such a failure.
私たちはこのような失敗の再発を妨げるためのすべての努力をするだろう。
(WATAKUSHITACHIWA KONOYONA SHIPPAINO SAIHATSUO SAMATAGERU TAMENO SUBETENO DORYOKU O SURUDARO)

Fig. 12(a)

original sentence in English    translated sentence in Japanese

◇ We have duly received your letter and the returned goods.

間違いなく私たちはあなたと返品の手紙を受け取った。
(MACHIGAINAKU WATAKUSHITACHIWA HENPINTO ANATANO TEGAMIO UKETOTTA)

Fig. 12(b)

◇ We request you to receive them on confirmation.

私たちはあなたにそれらを ご確認 の上で受け取るように求める。
(WATAKUSHITACHIWA ANATANI SORERAO KAKUNINNOUEDE UKETORUYONI MOTOMERU)

《confirmation》
1. confirmation  2. corroboration
3. ratification  4. ascertain

Fig. 12(c)

◇ We will make every endeavor to prevent the recurrence of such a failure.

私たちはこのような失敗の再発を防げるためのすべての 努力 をするだろう。
(WATAKUSHITACHIWA KONOYONA SHIPPAINO SAIHATSU SAMATAGERU TAMENO SUBETENO DORYOKUO SURUDARO)

word :
part of speech :
translation :

Fig. 16(a)

◇ One central goal of Artificial In- 210a
  telligence is to make computers
  more useful.
              ↑
              211a
  ┌───「情けは人のためならず。────┐
  └───────────「という諺がある。─────┘

(There is a proverb such that
  one good turn asks another )

Fig. 16(b)

210b
One central goal of Artificial
Intelligence is to make computers
more useful.
              ↑
              211b
  ┌───「情けは人のためならず」──┐
  └─────────「という諺がある。────┘

(There is a proverb such that
  one good turn asks another)

TRANSLATING APPARATUS

BACKGROUND OF THE INVENTION

The present invention relates to a translating apparatus of a conversation type in which a correct translation is fabricated in cooperation between an operator of the apparatus and the translating apparatus.

A prior art translating system is so designed that only one translated sentence is outputted with respect to an original sentence inputted into the translating apparatus for translation. For example, a translating system for translating an original sentence of the English language into the Japanese language will be described a little more in detail. Supposing that "He is one of the greatest *figures* of this century." in English is inputted, the fourth translated term in Japanese for the word "figure" is selected, according to the above system, among these of 1. numeral, 2. calculation, number, 3. appearance, countenance, style, 4. man, character, image, portrait, and 5. drawing, diagram, shape, form, through the analysis of the original sentence (analysis of structure of the sentence, analysis of meaning of the sentence, etc.). As a result, only one translated sentence, that is "He is one of the greatest *men* of this century." is outputted in Japanese.

In the meantime, with respect to an original English sentence, for example, "This rose smells sweet.", there are considered two kinds of Japanese translations, namely, (1) "The *smell* of this rose is sweet." and (2) "The *fragrance* of this rose is sweet.". In this connection, however, if the former Japanese translation "smell" is indicated first in the dictionary before the latter translation "fragrance", the system is so constructed as to output the former (1) translation.

As is described hereinabove, since the prior art system is of the construction that outputs only one translated sentence with respect to the inputted original, it is inconvenient that the outputted sentence cannot be easily corrected even in the case that "the greatest characters" is more suitable from the viewpoint of nuance that "the greatest men" in the above former example, and the (2) translation is better in the latter example.

SUMMARY OF THE INVENTION

Accordingly, the present invention has been developed with a view to substantially solving the above-described inconvenience inherent in the prior art translating system, and has for its essential object to provide an improved translating apparatus.

In order to accomplish this object, according to the present invention, the translating apparatus is so arranged that, in the translated sentence outputted as, for example, "He is one of the greatest *persons* of this century." in Japanese, when a cursor is moved to the word "person" and a return key is operated, synonyms related to the translated term "person" indicated by the cursor are displayed in the manner as follows.

"He is one of the greatest

|(1) persons|
|(2) characters|
|(3) images|
|(4) portraits| of this century."

Thereafter, when the (2) translation is indicated among the displayed synonyms, "persons" is replaced with "characters" to read "He is one of the greatest *characters* of this century." Accordingly, the translating apparatus of the present invention is able to make an expression with minute and delicate nuance.

Another object of the present invention is to provide a translating apparatus of the type referred to above in which an original sentence and its translated sentence in an editable region on the display screen are able to be displayed in a different manner from other original sentences and their translated sentences.

A further object of the present invention is to provide a translating apparatus of the type referred to above which is so functioned as to edit both the original sentence and its translated sentence on the basis of the respective linguistic characteristics so that the edited original sentence is displayed in correspondence with position to its translated sentence.

A still further object of the present invention is to provide a translating apparatus of the type referred to above which is so designed that, when the translating operation is being carried out, the fact is automatically displayed on the display screen.

BRIEF DESCRIPTION OF THE DRAWINGS

These and other objects and features of the present invention will become apparent from the following description taken in conjunction with preferred embodiments thereof with reference to the accompanying drawings, in which:

FIG. 6 is a flow-chart explanatory of the operation of the translating apparatus of FIG. 1;

FIGS. 11 and 12(*a*) to 12(*c*) are views respectively showing an example of display in the display part of the apparatus of FIG. 9;

FIGS. 16(*a*) and 16(*b*) are views explanatory of the sequence of the editing operation carried out by the apparatus of FIG. 13;

DETAILED DESCRIPTION OF THE EMBODIMENTS

Figure 1:
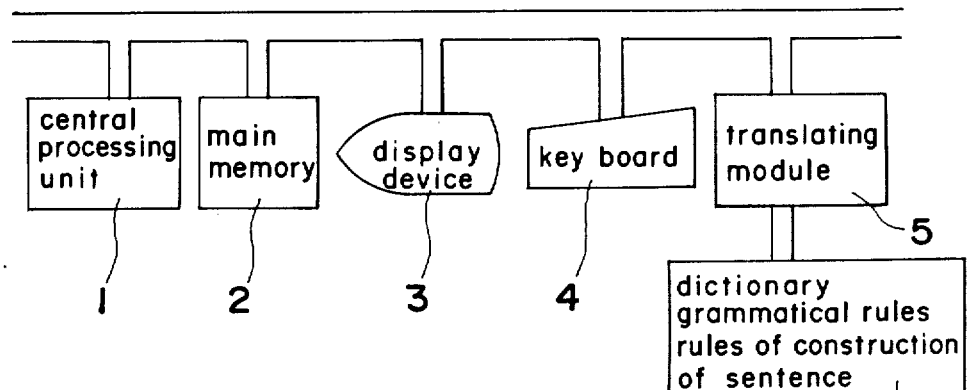
FIG. 1 is a block diagram showing the construction of a translating apparatus according to a first embodiment of the present invention.

Before the description of the present invention proceeds, it is to be noted that like parts are designated by like reference numerals throughout the accompanying drawings.

Referring first to FIG. 1, there is shown a block diagram explanatory of the construction of a translating apparatus according to a first embodiment of the present invention. The translating apparatus includes a central processing unit (CPU) 1 for performing the translating operation, etc., a main memory 2 for storing therein programs necessary for the translating operation in the CPU 1, a display device (CRT) 3 used for displaying the translating operation, a keyboard 4 through which necessary information for the translating operation is inputted, a translating module 5 storing therein necessary information during the process of the translation and a table 6 which contains a dictionary, grammatical rules and rules related to the change in the structure of a sentence.

Figure 2:
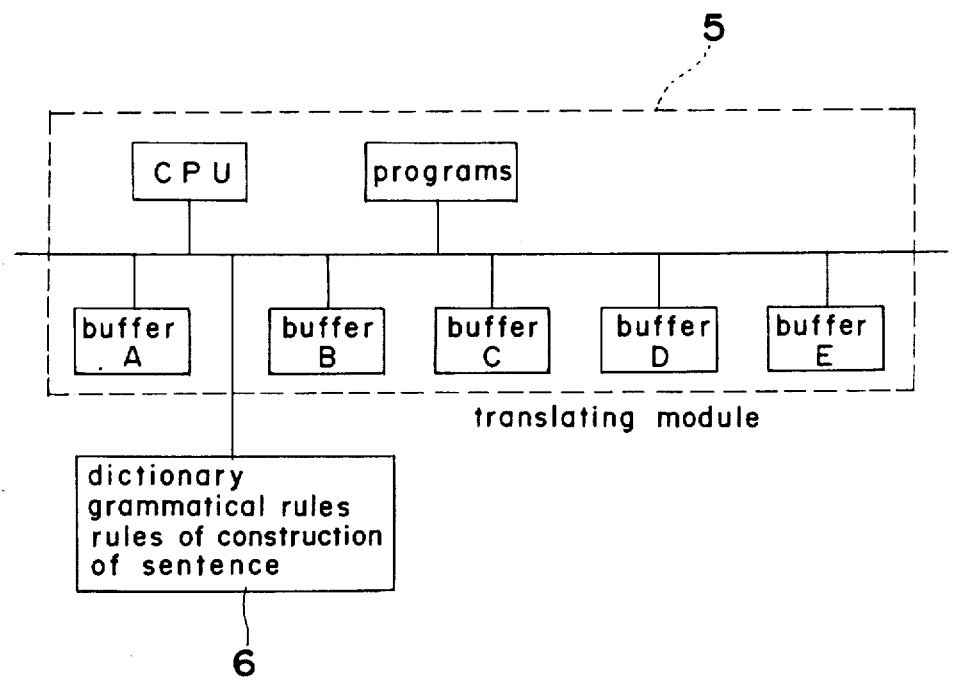
FIG. 2 is a block diagram of a translating module of the translating apparatus of FIG. 1.

A preferred embodiment of the translating module 5 shown in FIG. 2 includes five buffers, A, B, C, D and E, a CPU and a memory of translation programs. Each of these buffers A, B, C, D and E stores data in respective analysis level of the translating process, as will be described later.

Figure 3:
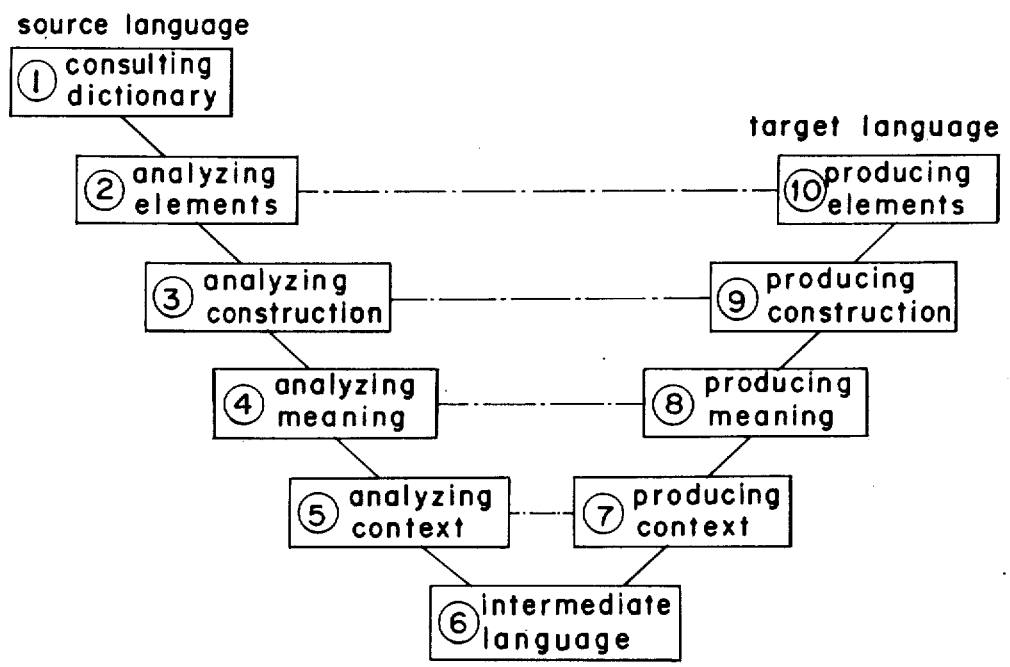
FIG. 3 is a diagram explanatory of the procedure of a translating operation carried out by the translating apparatus of FIG. 1.

A general translating operation using a translating machine will be described hereinbelow. In general, there are such levels as shown in FIG. 3 in the translation by machine. When a source language is inputted from the upper left portion as seen in the drawing, the analyzing operation will proceed from level (1) of consulting a dictionary through level (2) of analyzing elements of the state to level (3) of analyzing the structure of a sentence. The translation by machine is roughly divided into two systems. One is a pivot system according to which the source language is analyzed into a concept not relying on any language (referred to as an intermediate language) in level (6), thereby to form a target language. The other is a transfer system according to which the source language is analyzed into any one of levels (2), (3), (4) and (5) so as to obtain the internal structure thereof, which structure is in turn changed into the structure of a target language of the same level as that of the source language to produce the target language. Hereinbelow, the content of each of the analyses will be described in Table 1.

TABLE 1

| Analysis | Content |
| --- | --- |
| Step 1. Consultation of a dictionary and analysis of elements of the state of a sentence. | To consult a dictionary for the translation so as to obtain grammatical information with respect to a part of speech or the like, and translated terms for each word, and to analyze the tense, person, number, etc. of the sentence. |
| 2. Analysis of the | To determine the |

TABLE 1-continued

| Analysis | Content |
| --- | --- |
| structure of a sentence. | structure of the sentence by correlation between words. |
| 3. Analysis of the meaning of a sentence. | To distinguish what is correct from what is incorrect from the viewpoint of the meaning through analysis of the structure of a plural number of sentences. |
| 4. Analysis of the context. | To understand what is intended in the sentence and to remove abbreviated or ambiguous expressions. |

Figure 4:
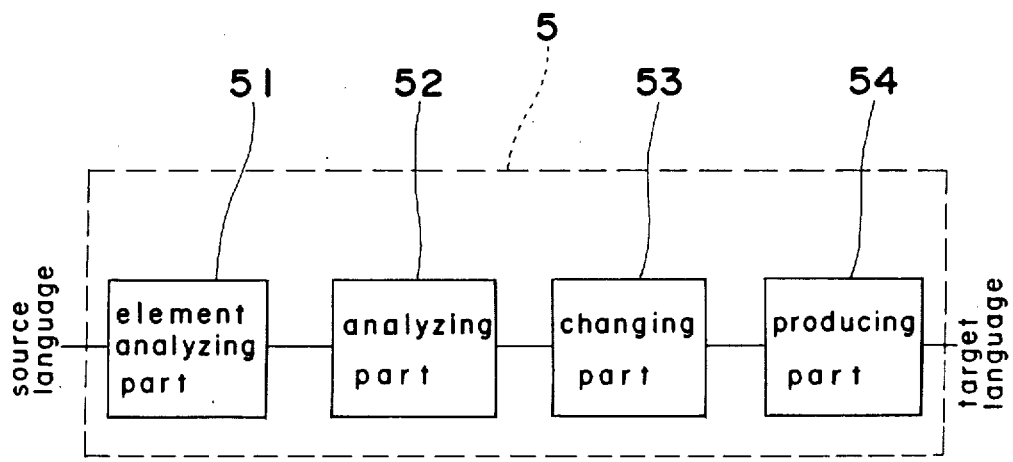
FIG. 4 is a diagram explanatory of the concrete construction of the translating module of the translating apparatus.

In the translating module in the first embodiment, the analysis is carried out at least to level (3), that is, the analysis of the structure of a sentence. In other words, the translating module is comprised of an analyzing part 51 for consulting a dictionary and analyzing elements of the condition, an analyzing part 52 for analyzing the structure of a sentence, a language changing part 53 and a target language producing part 54, as is shown in FIG. 4.

Figures 5A, 5B, 5C:
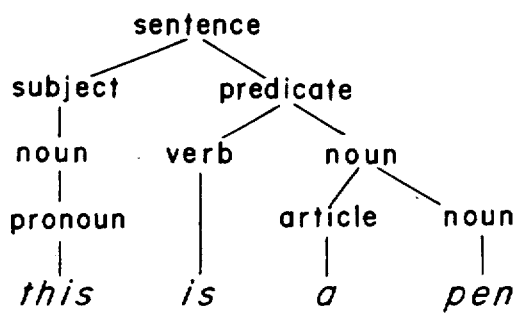
FIGS. 5(*a*) to 5(*e*) are views respectively showing the content stored in each of the buffers of the translating apparatus.

FIG. 5 shows the content of each of the buffers A-E of FIG. 2 in the case that an English sentence "This is a pen." is to be translated into Japanese. First, the original sentence is stored in the buffer A of FIG. 2 in the manner as shown in FIG. 5(a). Necessary information for each of the words in the original sentence are drawn out by the analyzing part 51 to be stored in the buffer B of FIG. 2. Information related to a part of speech which is included in the above-mentioned necessary information is indicated in FIG. 5(b). Although the word "this" is workable as various kinds of a part of speech, it is determined to express a certain means by the analyzing part 52, the correlation of which is stored in the buffer C in the manner as indicated in FIG. 5(c). At this time, an analysis represented in Table 2 is conducted based on the grammatical rules in Table 6 of FIG. 2.

TABLE 2

| Element | Construction |
| --- | --- |
| A sentence | A subject, a predicate |
| A subject | A noun phrase |
| A predicate | A verb, a noun phrase |
| A noun phrase | A pronoun |
| A noun phrase | An article, a noun |

Figures 5D, 5E, 7, 8:
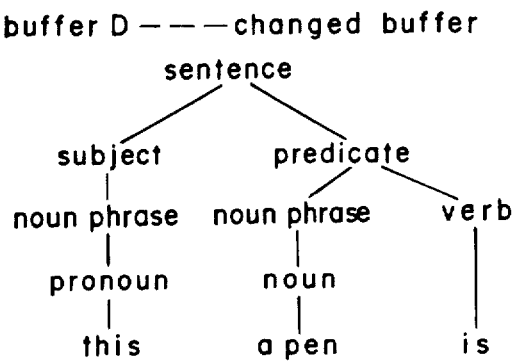
FIGS. 7 and 8 are views respectively showing an example of dictionary display.

The grammatical rules contained in Table 6 represent, for example, that "A sentence is made of a subject and a predicate." In the language changing part 53 of FIG. 4, an analysis based on the rules of the structural change carried out in the same manner as in the analysis of the structure of the sentence, the result of which is stored in the buffer D in the manner as indicated in FIG. 5(d). The analyzed result is added with an appropriate auxiliary word and a suitable auxiliary verb to be formed into a style of the Japanese language to be stored in the buffer E in the manner as shown in FIG. 5(e), which becomes an output of the translating module 5.

FIG. 6 is a flow-chart showing the sequence of the translating operation carried out by the apparatus of the present invention. When one English sentence made of the source language, namely, "He is one of the greatest figures of this century." is inputted in step n1, the consultation of a dictionary and the analysis of elements of the condition are carried out so as to determine the fist combination of parts of speech selected suitable in correspondence to each word in step n2. The determined row of parts of speech is analyzed in structure thereof in step n3. In the case that the analysis results in success, the flow proceeds to step n4 where the language is changed and then to step n5 where the target language is produced. Then, the result of the translation by the use of the terms employed in the structural analysis, i.e., "He is one of the greatest > men of this century." is produced in step n6, which is then displayed by the CRT display device 3.

Next, in step n7, it is selected by an operator whether or not all of the translated terms (synonyms) of a desired word in the inputted sentence should be displayed. In the case that all of the terms need not be displayed, the flow goes to step n16 where it is detected whether a subsequent sentence follows. Without any sentence following, the translating operation is completed, with the flow returning to step n1 where a next sentence starts to be translated.

On the other hand, in the case that all of the translated terms (synonyms) for the desired word should be displayed in step n7, the desired word (for example, "figure") is indicated in step n8. By way of indication, the cursor is moved to the word "figure" or the word "figure" is inputted through the keyboard. In this case, although the word "figure" has such translated terms as described earlier, the fourth group of terms (man, character, image, portrait) is selected through analysis of the terms which is in turn displayed in step n9 in the manner as shown in FIG. 7.

When the translated term is desired to be changed, the operator should answer "yes" in response to an inquiry from the apparatus in step n10. After the answer "yes" is inputted, the indicated word, namely, the translated term corresponding to "figure" in the present instance, i.e., "man" is reversed in step n11, with the cursor being moved to the head of an item of the translated terms in step n12.

At this time, after the cursor is moved to a certain translated term (for example, "character") in step n13 (with reference to FIG. 8), the pushing of a return key erases the term which is displayed while being reversed in the CRT screen (in this case, "man") in step n14. Thereafter, the desired term ("character") indicated by the cursor is inserted at the position where the reversed term is previously located. Then, "He is one of the greatest > characters of this century." is indicated in step n15. The flow now returns to step n7.

Accordingly, in the translating apparatus of the present invention, synonyms related to a desired term (word) in the inputted sentence are displayed so that the most appropriate one of the synonyms can be replaced with the desired term, thereby enabling a delicate expression with subtle distinction in nuance.

As is described above, the translating apparatus of the present invention can effect the following advantages:

(1) When another way of expression is desired although the translation itself is correct, a more suitable translated term or terms can be selected through consultation of a dictionary contained in the apparatus, without any necessity to refer to a dictionary of synonyms commercially available.

(2) When an English word, for example, "like" is included in the inputted sentence to be translated, the apparatus selects the group of verb terms "like, desire". In this case, also an auxiliary word of the object is changed, as is seen from "I like reading." and "I desire to read." Accordingly, since the translating apparatus of the present invention can change or replace the translated term together with an auxiliary word thereof, it is helpful for the operator to be free from care during the operation.

Figure 9:
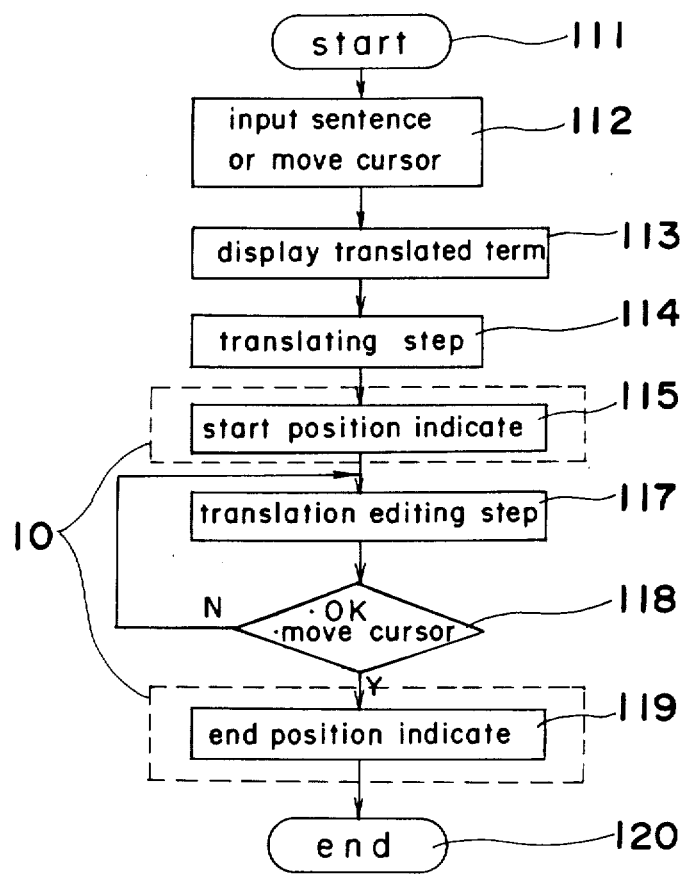
FIG. 9 is a flow-chart showing the operation of a translating apparatus according to a second embodiment of the present invention.
Figure 10:
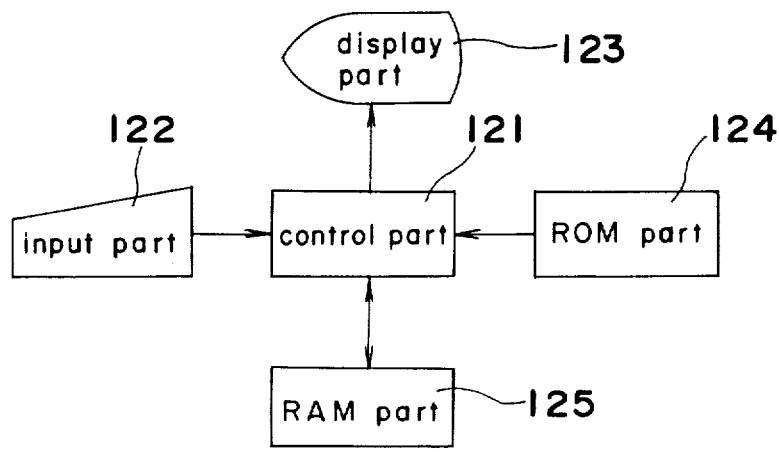
FIG. 10 is a block diagram showing the construction of the translating apparatus of FIG. 9.

A second form of a translating apparatus according to the present invention is illustrated in FIGS. 9 and 10 respectively showing a flow-chart explanatory of the sequence of the operation, and a block diagram of the construction thereof.

First, the construction of the apparatus will be schematically explained with reference to FIG. 10. The apparatus includes a control part 121 comprised of a CPU, etc., an input part 122, a display part 123, a ROM part 124 and a RAM part 125.

The above-described input part 122 has a keyboard provided with various kinds of keys for inputting an original sentence (for example, an English sentence), editing the original sentence and its translated sentence (for example, a Japanese sentence) or performing any other operations.

The display part 123 is comprised of display devices such as cathode ray tubes (CRT) which are able to display the original sentence in correspondence to the translated sentence, and with ruled lines, electroluminescence displays (EL displays), liquid crystal displays, plasma displays or the like.

In the ROM part 124, consisting of read-only memories, are stored kinds of a dictionary or a table necessary for the translating operation, programs for carrying out the translating operation and programs for displaying the translation, etc.

On the other hand, the RAM part 125, consisting of random-access memories, has each of the memory areas thereof utilized for a register memory or a display buffer during the performance of each of the programs.

The operation of the translating apparatus in accordance with the second embodiment will be described hereinbelow with reference to the flow-chart of FIG. 9 and an example of display of FIG. 11.

Original sentences inputted through the keyboard disposed at the input part 122 are successively transferred to the display part 123 in which the originals are displayed at the position indicated as "original" 131a on the display screen (the inputting step 112). After a fixed unit of the originals (for example, a unit of one sentence) have been inputted through the keyboard in the manner as above, when the translating operation is ordered by a function key of the input part 122 (the ordering step 113), the translating operation is started with the help of the dictionary, the table or the like in the ROM 124 (the translating step 114). Thus, the resultant translation is displayed at the position indicated as "translated sentence" 131b on the display screen (referring to FIG. 11). Thereafter, the resultant translation is edited in conversation between the apparatus and the operator in order to correct or change an inadequate portion therein (the editing step 117). When an approval is obtained from the operator (the approving step 118), the original sentence is completely translated, and the flow proceeds to another translating operation of a new original sentence.

In the process of the translating operation described above, there are provided a display starting step 115 and a display ending step 118 before and after the editing step 117, respectively. Therefore, in order to carry out the editing operation in step 117, first, the program for displaying the region to be edited in the translation which is stored in the ROM part 124 is processed in step 115 so that an original sentence and its translated sentence to be edited are distinguished, by a frame 133 as shown in FIG. 11, from the originals and their translated sentences being displayed on the screen. Then, when the original or the translated sentence thereof encircled by the frame 133 are edited, the frame 133 is erased in step 119.

The aforementioned indication of the region to be edited is conducted by depressing a predetermined key after the cursor 134 is moved to the region of the original sentence to be edited. In other words, it is so arranged that when the cursor 134 is moved to below a word in the original sentence to be edited and the predetermined key is depressed, the portion related to the original sentence is read into the RAM again so as to be able to be edited, and at the same time, the subject original sentence and its translated sentence are surrounded by the frame 133.

As shown in FIG. 12, in the editable region, it is made possible to effect a side-by-side displaying function (referring to FIG. 12(a)), a candidate selecting function (referring to FIG. 12(b)) and an operator's dictionary registering function (referring to FIG. 12(c)). By the side-by-side translation displaying function, when a desired word both in the original sentence and in the translated sentence are indicated by the cursor, with a predetermined key being depressed, the word is displayed in such a manner as to be distinguished from other words. On the other hand, according to the candidate selecting function, when some word in the original sentence is indicated by the cursor and the predetermined key is depressed, the translated terms with respect to some other related words are indicated in a window 136, so that the operator can select one translated term most suitable thereamong. Further, according to the dictionary registering function, when it is indicated that the translated term of a word in the original sentence is not suitable, a more appropriate term for the word can be registered in a window 137.

It is to be noted that in FIG. 11, numerals 132a and 132b are ruled lines, and a numeral 132c is a head mark of the original sentence.

Moreover, although the editable region is encircled by the frame 133 in the foregoing embodiment, it may be possible that the editable region is displayed in a different color, or the display in the editable region is reversed.

As is clear from the foregoing embodiment, according to the translating apparatus of the present invention, since it is so arranged that the original sentence and its translated sentence within the editable region are displayed on the screen, with clear distinction from others without the editable region which therefore need not be edited, it is of high convenience for the operator that the translating apparatus can be operated with much ease.

Figure 13:
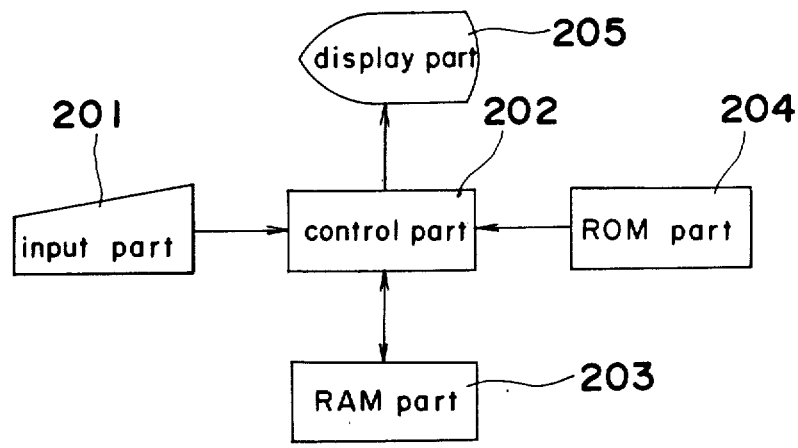
FIG. 13 is a block diagram showing the construction of a translating apparatus according to a third embodiment of the present invention.

Referring further to FIG. 13 showing a block diagram of a translating apparatus according to a third embodiment of the present invention, an input part 201 is comprised of a keyboard, etc., in which the original sentence is inputted, the original sentence and its translated sentence are edited, and various kinds of other operations are ordered.

The translating apparatus also has a control part 202, a read-write memory RAM 203 and a read-only memory ROM 204. Owing to these components, the original sentence inputted in the input part 201 is translated, the original sentence is edited based on the linguistic characteristics thereof, and further the translated sentence is edited on the basis of the linguistic characteristics thereof.

Hereinafter, the operation of the translating apparatus will be described on the assumption that the original sentence is in the English language, and the translation thereof is made in the Japanese language.

The ROM 204 stores (a) kinds of a dictionary and a table necessary for the translating operation, (b) programs for carrying out the translating operation, and (c) programs for handling prohibitions. The RAM 203 is used as a register memory or a display buffer while each of the programs is being processed.

Figure 14:
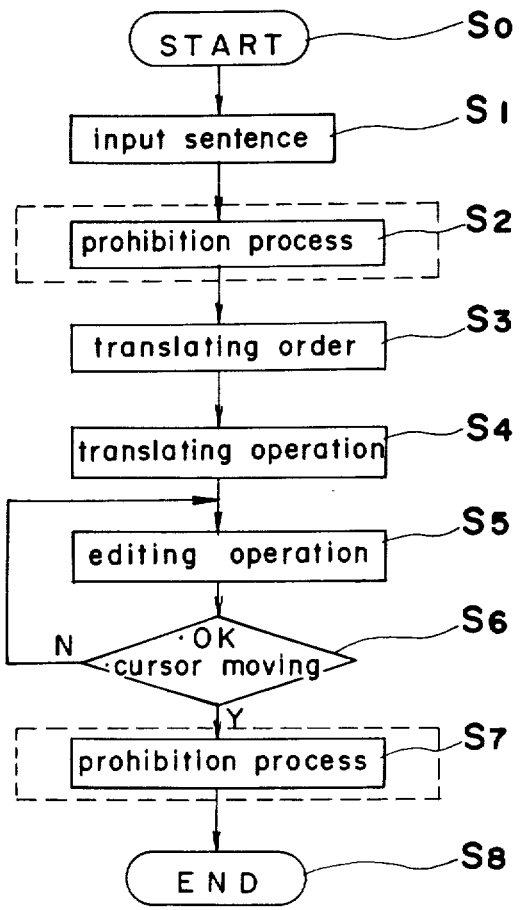
FIG. 14 is a flow-chart showing the procedure of the translating operation carried out by the apparatus of FIG. 13.

Referring to a flow-chart of FIG. 14, and examples of display in FIGS. 15 and 16, the original sentence inputted into the input part 201 are transferred to the display part 205 successively to be displayed below an original mark 206a on a display screen 209 shown in FIG. 15 (step S1 of FIG. 14). Once a predetermined unit of the originals (for example, a unit of one sentence) is inputted (step S1), the original is processed with respect to the prohibitions (step S2).

Then, when an order of the translating operation is made by a function key or the like in the input part 201 (step S3), the translating operation is performed with the use of the dictionary and the table in the ROM 204 (step S4), the result of which is displayed at the side of a translation mark 206b corresponding to the original mark 206a on the display screen 209. Thereafter, the apparatus is brought into the editing operation (step S5) where an improper or inadequate portion in the translated sentence is corrected or changed in conversation between the apparatus and the operator.

After the lapse of time, when an approval from the operator is detected or the movement of the cursor is detected (step S6), the translated sentence is processed with regards to the prohibitions (step S7).

Figure 15:
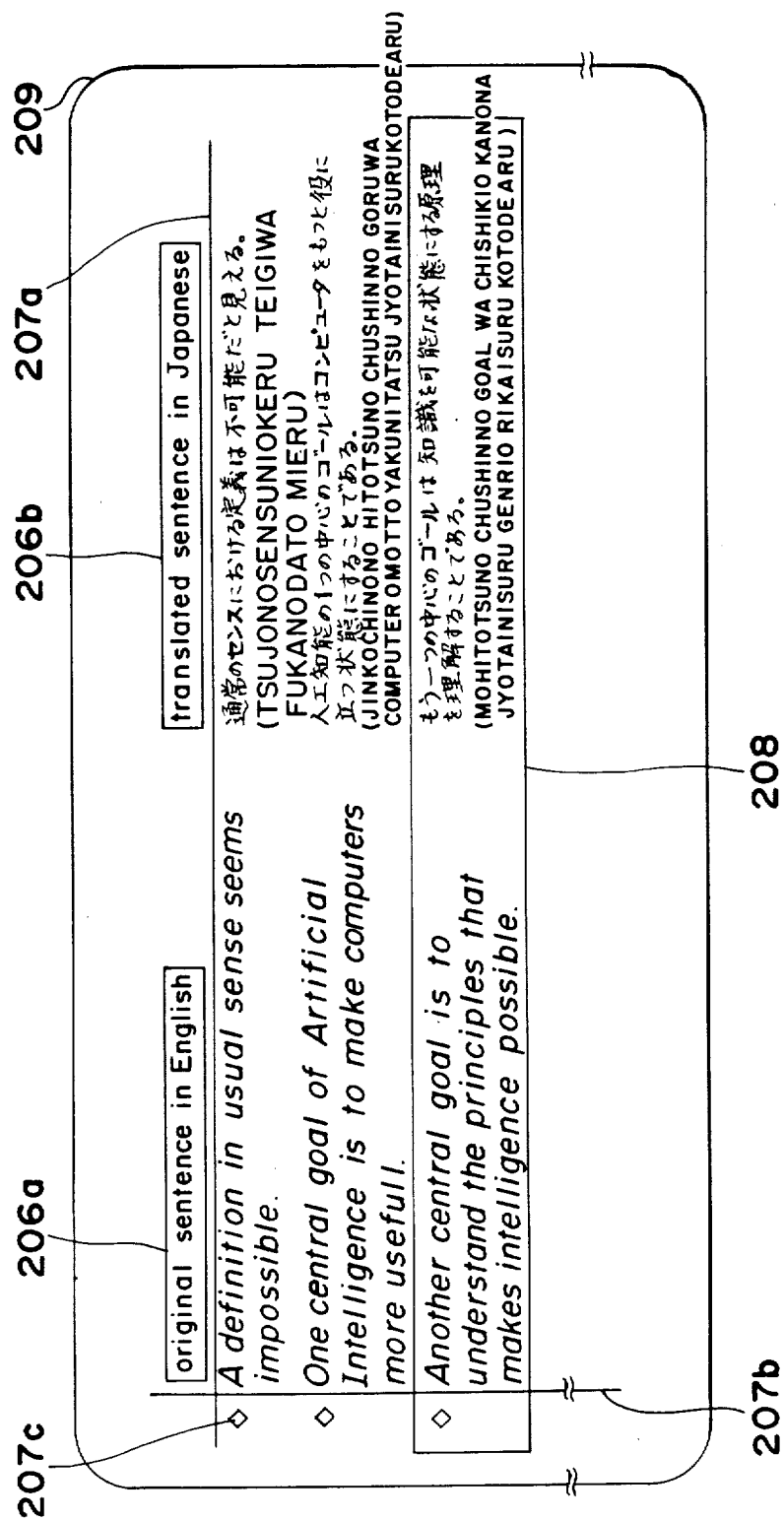
FIG. 15 is a view showing a display screen of the translating apparatus of FIG. 13.

When the above-described procedure is repeated in the other original sentences, such a display as illustrated in FIG. 15 is obtained. It is to be noted that ruled lines 207a and 207b, a head mark of the original sentence 207c and a frame 208 in FIG. 15 are employed in order to clarify the correlation between the original sentence and its translated sentence, as well as the editable region, and therefore, these reference numerals are not directly related to the present invention.

As is described hereinabove, the translating apparatus in accordance with the third embodiment of the present invention is so arranged as to carry out the editing operation on the basis of characteristics of each language, and to display the edited original sentence in correspondence with position to the edited translated sentence.

In order to perform the editing operation in English, as shown in FIG. 16(a), the apparatus can display such functions as the Word wrap around function, the Hyphenation function, etc. in addition to a so-called Justify function by which one English word 210a ranging over two lines is arranged to be displayed in either one of the two lines (as shown by a reference 210b).

On the other hand, in order to perform the editing operation in Japanese, as shown in FIG. 16(b), such representative prohibitions are noted that a closing bracket 211a should not be at the head of a line, but be brought to the end of a preceding line (as indicated by a reference 211b), or a closing bracket, a mark or a punctuation mark should not be described at the head of a line.

Thus, as described above, if the original sentence and its translated sentence are edited on the basis of the respective linguistic characteristics, it becomes easy for the operator to see the original sentence and the translated sentence displayed in correspondence to each other.

Accordingly, since the translating apparatus of the present invention is provided with a first editing means which edits the original sentence on the basis of the linguistic characteristics of the original sentence, a second editing means which edits the translated sentence on the basis of the linguistic characteristics of the translated sentence and a display means which displays the original sentence edited by the first editing means in correspondence with the translated sentence edited by the second editing means, it becomes easier for the operator to see the original sentence and the translated sentence within the editable region, thereby preventing the operator from being excessively fatigued, which will improve the translating efficiency.

Figure 17:
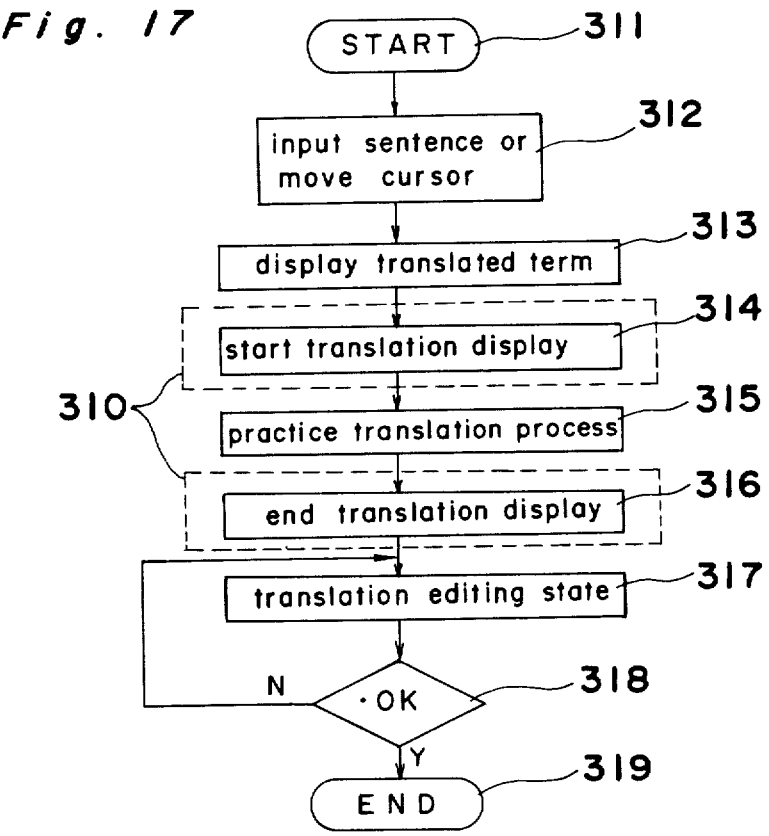
FIG. 17 is a flow-chart showing the operation of a translating apparatus according to a fourth embodiment of the present invention.

In FIG. 17, there is shown a flow-chart of the sequence of the translating operation performed by a translating apparatus of a fourth embodiment of the present invention.

Figure 18:
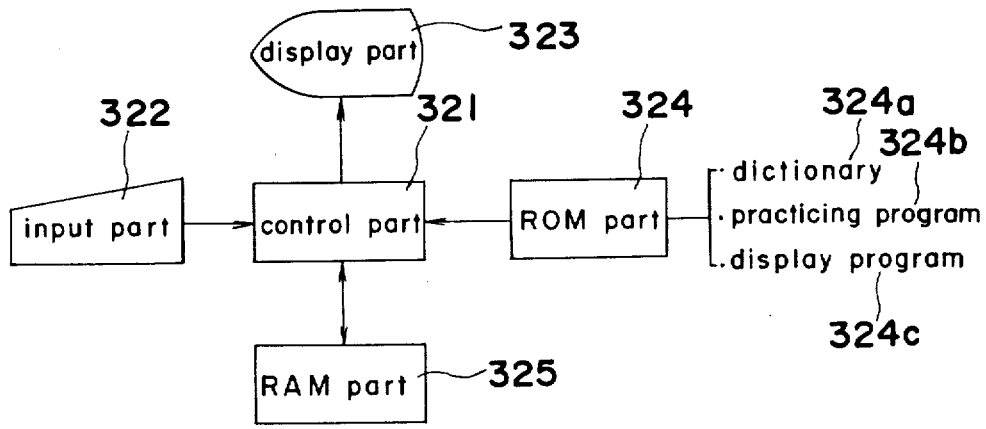
FIG. 18 is a block diagram showing the construction of the apparatus of FIG. 17.

First, the construction of the translating apparatus according to the fourth embodiment will be schematically described with reference to a block diagram of FIG. 18. The translating apparatus includes a control part 321 comprising a CPU, etc., an input part 322, a display part 323, a ROM part 324 and a RAM part 325.

The input part 322 has a keyboard provided with various function keys for inputting an original sentence (for example, an English sentence), editing the original sentence and its translated sentence (for example, a Japanese translation) or performing other operations.

The display part 323 is composed of display devices which can display the original sentence in correspondence with position to the translated sentence, such as cathode ray tubes (CRT), electro-luminescence displays (EL displays), liquid crystal displays, plasma displays, etc.

In the ROM 324 consisting of read-only memories, there are stored kinds of a dictionary or a table 324a for the translating operation, a program 324b for performing the translating operation and a program 324c for displaying the translation. Moreover, each of the memory areas of the RAM part 325 consisting of random access memories is utilized for a register memory or a display buffer while each of the programs is being carried out.

The operation of the translating apparatus will be described now with reference to the flow-chart of FIG. 17 and an example of display shown in FIG. 19.

Figure 19:
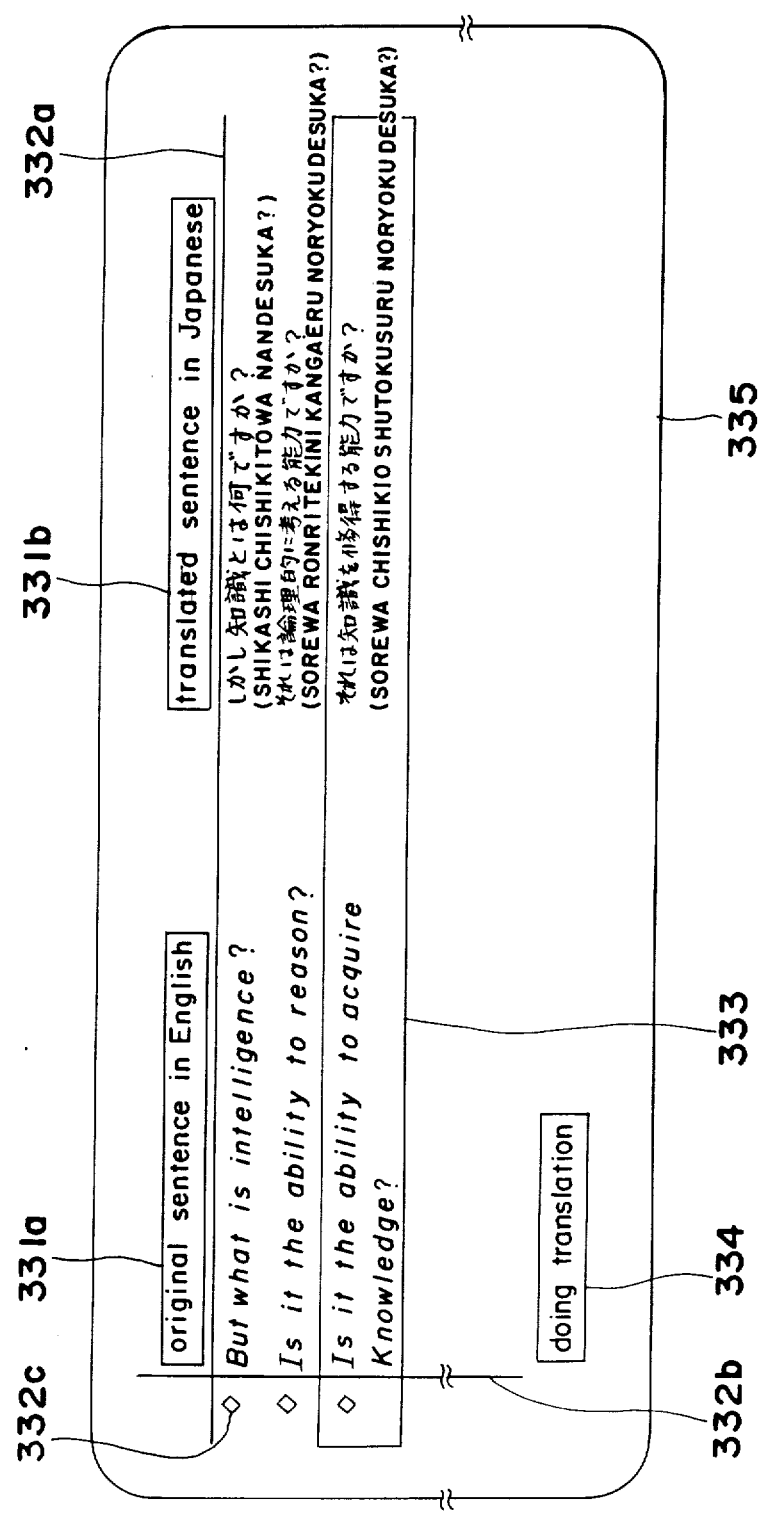
FIG. 19 is a view showing an example of display in the display part of the apparatus of FIG. 17.

The original sentences inputted through the keyboard of the input part 322 are transferred to the display part 323 successively to be displayed at the position indicated by "original" 331a on the display screen as shown in FIG. 19 (the inputting step 312). After a predetermined unit of original sentences (for example, a unit of one sentence) are inputted through the keyboard in the manner as described hereinabove, upon indication of the translating operation by a function key of the input part 322 (the indication step 313), the translating operation is conducted with the use of the dictionary and/or the table stored in the ROM 324 (the translating step 315). Then, the result of the translating operation is displayed at the position indicated by "translated sentence" 331b on the display screen 335 (with reference to FIG. 19). Thereafter, the apparatus is brought into editable condition in which an inadequate portion in the translated sentence is corrected or changed in conversation between the operator and the apparatus (the editing step 317). When an approval is gained from the operator in step 318, the translating operation for the original sentence is completed, with the flow passing to a step where a next original sentence is to be translated.

During the procedure of the above translating operation, since there are provided a starting step 314 in which the display of the translated sentence is started and an ending step 316 in which the display of the translated sentence is completed, respectively, before and after step 315, the program stored in the ROM 324 for displaying the translation is processed in step 314, resulting in the display of "under translation" 334 at the lower left corner of the display screen. Then, when the translating operation is completed, the flow proceeds to step 316 where the "under translation" display 334 is erased.

Thus, in the manner as described hereinabove, the "under translation" display is automatically effected on the display screen of the display part 323 when the translating apparatus starts the translating operation, and accordingly, the operator can easily detect the condition of the apparatus.

Although the display is expressed in such a manner as "under translation" in the foregoing embodiment, the manner of the display is not restricted to this.

Moreover, in FIG. 19, numerals 332a and 332b represent ruled lines, with a numeral 332c representing a head mark of the original sentence and a numeral 333 representing a frame line, which are used so as to make clear the correlation between the original sentence and the translated sentence and, the editable region.

Since the translating apparatus according to the present invention can indicate the condition that the translating operation is being carried out when the apparatus is in such condition, the operator can easily confirm, during the translating operation, that the apparatus works well, therefore being relieved from unnecessary anxiety. Moreover, in the translating apparatus of the present invention, it is rendered possible to detect immediately whether the apparatus is in a normally-operated condition or in an inoperative condition resulting from an accidental runaway of the program or the like, and accordingly, prompt countermeasures can be taken thereagainst.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electronic language translator comprising:

memory means for storing character information related to a plurality of terms in a first language and a like plurality of groups of translated terms in a second language, each group including synonyms corresponding to a separate one of the individual terms in said first language;

input means for entering character information constituting a sentence containing individual terms in said first language;

address means responsive to the input means for addressing the memory means to identify the address in said memory means at which selected individual terms are stored;

translator means responsive to said address means for retrieving from said memory means said group of translated terms in said second language corresponding to said individual terms in said first language; and means for selecting one of said translated terms in said sentence, display means for displaying said synonyms of said selected translated term, and replacing means for replacing a selected translated term with a synonym selected from said synonyms displayed by said display means.

* * * * *